(12) United States Patent
Partridge et al.

(10) Patent No.: US 9,562,745 B2
(45) Date of Patent: Feb. 7, 2017

(54) PERSONAL PORTABLE POWER DISTRIBUTION APPARATUS

(75) Inventors: Miles Partridge, South Yarra (AU); John Retelj, Werribee (AU); Anatoly Kaganov, Elsternwick (AU)

(73) Assignee: Tectonica Australia Pty Ltd, West Melbourne, Victoria (AU)

(*) Notice: Subject to any disclaimer, the term of this patent is extended or adjusted under 35 U.S.C. 154(b) by 1041 days.

(21) Appl. No.: 13/120,810

(22) PCT Filed: Sep. 30, 2009

(86) PCT No.: PCT/AU2009/001302
§ 371 (c)(1),
(2), (4) Date: Apr. 27, 2011

(87) PCT Pub. No.: WO2010/037171
PCT Pub. Date: Apr. 8, 2010

(65) Prior Publication Data
US 2011/0260556 A1 Oct. 27, 2011

(30) Foreign Application Priority Data
Sep. 30, 2008 (AU) .............................. 2008905083

(51) Int. Cl.
*H02J 7/00* (2006.01)
*F41H 1/02* (2006.01)
(Continued)

(52) U.S. Cl.
CPC ............... *F41H 1/02* (2013.01); *G06F 1/163* (2013.01); *A41D 1/005* (2013.01); *A41D 27/205* (2013.01); *A45F 3/06* (2013.01)

(58) Field of Classification Search
USPC ........................................................ 307/150
See application file for complete search history.

(56) References Cited

U.S. PATENT DOCUMENTS 4,748,344 A * 5/1988 Sing .................... F21L 15/10
307/149
5,369,565 A 11/1994 Chen et al.
(Continued)

OTHER PUBLICATIONS

Mendelson, All You Need to Know About Power Over Ethernet (PoE) and the IEEE 802.3af Standard, PowerDsine Proprietary Information, 1-24, 2004.

*Primary Examiner* — Rexford Barnie
*Assistant Examiner* — Daniel Kessie
(74) *Attorney, Agent, or Firm* — Morgan, Lewis & Bockius LLP

(57) ABSTRACT

A personal portable power distribution apparatus including a portable central power source, a power management module coupled to receive power from the central power source, and a harness assembly having at least one power supply node for distributing power from the power management module, wherein the power management module is operable to control supply of power through each individual power supply node, each power supply node terminating in a like connector, and an adaptor module is fitted to a power input terminal of an electronic accessory device to adapt the device for operation with the power distribution apparatus by providing a corresponding connector suitable for interconnection with said like connector(s).

29 Claims, 12 Drawing Sheets

(51) Int. Cl.
*G06F 1/16* (2006.01)
*A41D 1/00* (2006.01)
*A41D 27/20* (2006.01)
*A45F 3/06* (2006.01)

(56) References Cited

U.S. PATENT DOCUMENTS

| | | | | | |
|---|---|---|---|---|---|
| 5,914,585 | A | * | 6/1999 | Grabon | G06F 1/163 |
| | | | | | 307/29 |
| 6,087,815 | A | * | 7/2000 | Pfeifer | B25F 5/00 |
| | | | | | 323/282 |
| 6,218,740 | B1 | * | 4/2001 | Mildice | H01R 31/005 |
| | | | | | 307/10.1 |
| 6,504,306 | B2 | * | 1/2003 | Menze | B60Q 1/305 |
| | | | | | 307/10.8 |
| 6,561,845 | B2 | * | 5/2003 | Ocheltree | H01R 27/02 |
| | | | | | 439/540.1 |
| 7,127,838 | B2 | * | 10/2006 | Menze | H01R 31/06 |
| | | | | | 37/195 |
| 7,137,724 | B2 | * | 11/2006 | Menze | B60Q 1/305 |
| | | | | | 307/10.1 |
| 2002/0084910 | A1 | * | 7/2002 | Owens | H04R 5/04 |
| | | | | | 340/4.37 |
| 2007/0278996 | A1 | * | 12/2007 | So | H01R 13/447 |
| | | | | | 320/107 |
| 2009/0091292 | A1 | * | 4/2009 | Nippear | H02J 7/0045 |
| | | | | | 320/111 |
| 2009/0132186 | A1 | * | 5/2009 | Esnard | G01R 31/361 |
| | | | | | 702/63 |
| 2009/0179615 | A1 | * | 7/2009 | Amron | H02J 7/0003 |
| | | | | | 320/114 |

* cited by examiner

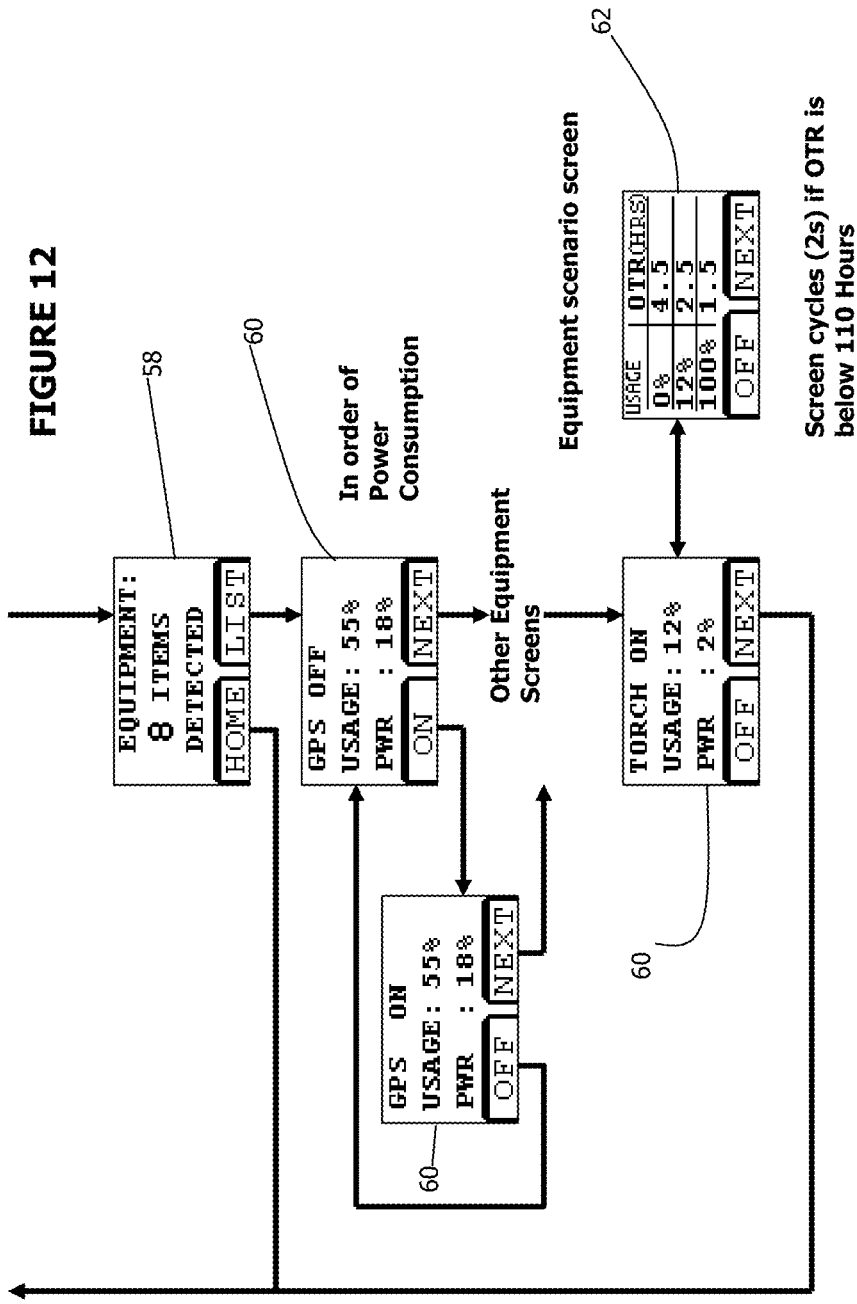

the present application is a U.S. National Phase Application of International Application No. PCT/AU2009/001302 (filed Sep. 30, 2009) which claims priority to Austrialian Application No. 2008905083 (filed Sep. 30, 2008) which are hereby incorporated by reference in their entirety.

PERSONAL PORTABLE POWER DISTRIBUTION APPARATUS

RELATED APPLICATIONS

The present application is a U.S. National Phase Application of International Application No. PCT/AU2009/001302 (filed Sep. 30, 2009) which claims priority to Austrialian Application No. 2008905083 (filed Sep. 30, 2008) which are hereby incorporated by reference in their entirety.

FIELD OF THE INVENTION

This invention relates to a personal portable power distribution apparatus and, more particularly but not exclusively, to a personal portable power distribution apparatus for supporting various electronic accessory devices attached to the webbing of a soldier.

BACKGROUND OF THE INVENTION

It is known to provide a personal Local Area Network (LAN) interconnection system for interconnecting various electronic devices such as radio, Global Positioning Systems (GPS), target acquisition, computing equipment, weapon sub-system and a power supply. Furthermore, it is known for such an interconnection system to be integrated into a webbing garment of a soldier for use in the field.

However, the applicant has identified various shortcomings present in existing interconnection systems. More particularly, the applicant has identified that existing interconnection systems require electronic devices which are specially developed for use with the interconnection system, and that the replacement of existing electronic devices with such specially developed devices represents a significant cost. Also, the applicant has identified that existing systems require specific electronic devices to be connected to specific power nodes of the interconnection system, resulting in a lack of interchangeability such that in the event of breakage of one power node the associated electronic device may no longer be operable.

Examples of the present invention seek to provide an improved interconnection system which overcomes or at least alleviates one or more of the disadvantages associated with known interconnection systems.

SUMMARY OF THE INVENTION

In accordance with one aspect of the present invention, there is provided a personal portable power distribution apparatus including a portable central power source, a power management module coupled to receive power from the central power source, and a harness assembly having at least one power supply node for distributing power from the power management module, wherein the power management module is operable to control supply of power through each individual power supply node, each power supply node terminating in a like connector, and an adaptor module is fitted to a power input terminal of an electronic accessory device to adapt the device for operation with the power distribution apparatus by providing a corresponding connector suitable for interconnection with said like connector(s).

Preferably, the harness assembly includes a plurality of power supply nodes, the power management module is operable to control supply of power through the individual power supply nodes, each of the power supply nodes terminates in a like connector, and the corresponding connector is suitable for interconnection with the like connectors.

Preferably, a plurality of electronic accessory devices are retro-fitted for operation with the power distribution apparatus by fitting an adaptor module to each of the devices, to provide each device with a corresponding connector suitable for interconnection with the like connectors. More preferably, the power management module is adapted to identify the electronic accessory devices and to control characteristics of supply of power to the devices accordingly such that the locations of the different devices may be interchanged between different connectors. In one example, each adaptor module has a battery incorporated to provide either autonomous operation when detached from the network or back-up function for powering the respective device in the event that power is not supplied from the central power source.

Preferably, the apparatus is fitted to a garment for wearing by a user. More preferably, the garment is a webbing type garment, and the apparatus is fitted to the garment by routing power leads of the harness assembly through apertures formed in the garment, and by locating the or each electronic accessory device in a pouch or other location for being supported by the webbing. In a preferred example, each power lead terminates in at least two power supply nodes. Each power lead may be held in place relative to a respective aperture in the garment by said at least two power supply nodes which are sized relative to the aperture such that they require being fed one at a time through the aperture in order to withdraw the power lead from the aperture.

Preferably, each of the power leads terminates in two power supply nodes, and wherein the power distribution apparatus further includes removable splitter leads for increasing the number of power supply nodes available.

Preferably, the power leads are routed through said apertures of the garment with the power leads being at least partly concealed behind modular pouches of the webbing type garment.

Preferably, the harness assembly comprises a plurality of power leads of sufficient length to reach chest, abdominal and/or shoulder regions of the garment. More preferably, the harness assembly comprises three power leads for reaching left-hand, right-hand and central parts of the garment.

It is preferred that the harness assembly is adapted to transmit information between components of the power distribution apparatus. In one example, the harness assembly is adapted to transmit information between the electronic accessory devices coupled to the connectors and the power management module, and the power management module is adapted to identify the electronic accessory devices from said information transmitted and to control characteristics of supply of power to the devices accordingly.

Preferably, the distribution apparatus further includes a control unit connected to the power management module for controlling power distribution. More preferably, the control unit has a display indicating power remaining in the central power source. Even more preferably, the control unit is adapted to enable the user to control the electronic accessory devices by operating the control unit. In a preferred example, the control unit is adapted to enable the user to control the central power source by operating the control unit.

In accordance with another aspect of the present invention, there is provided a personal portable power distribution apparatus including a portable central power source, a power management module coupled to receive power from the central power source, and a harness assembly having at least one power supply node for distributing power from the power management module, wherein the power management module is operable to control supply of power through each individual power supply node, each power supply node terminating in a like connector, and the power management module is adapted to identify electronic devices coupled to the connectors and to control characteristics of supply of power to the devices accordingly.

Preferably, the power management module is operable to distribute power to the individual electronic accessory devices at the highest possible voltage so as to reduce current and thus energy loss through resistance.

BRIEF DESCRIPTION OF THE DRAWINGS

The invention is described, by way of non-limiting example only, with reference to the accompanying drawings in which:

FIG. 12 is a flowchart showing an example of use of the control unit.

DETAILED DESCRIPTION

Figure 1:
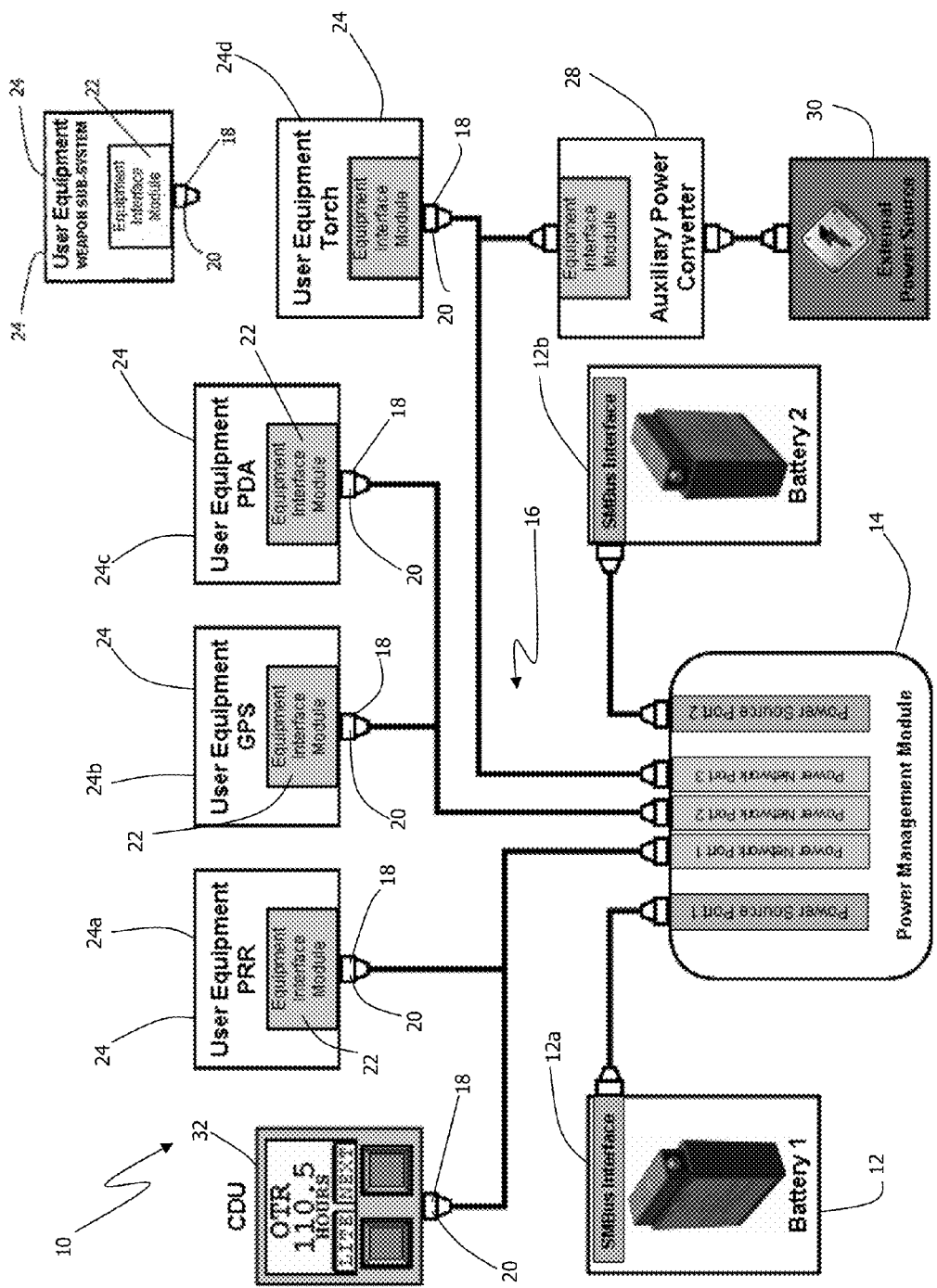
FIG. 1 is a diagrammatic view of a personal portable power distribution apparatus in accordance with an example of the present invention.

With reference to FIG. 1, an example personal portable power distribution apparatus 10 includes a portable central power source 12, a power management module 14 coupled to receive power from the central power source 12, and a harness assembly 16 having a plurality of power supply nodes 18 for distributing power from the power management module 14. The power management module 14 is operable to control supply of power through the individual power supply nodes 18. Each of the power supply nodes 18 terminates in a like connector 20. An adapter module 22 is fitted to a power input terminal of an electronic accessory device 24 to adapt the device 24 for operation with the power distribution apparatus 10 by providing a corresponding connector 26 suitable for interconnection with the like connectors 20.

Accordingly, by virtue of the adapter module 22, a variety of electronic accessory devices 24 (such as, for example, a battery recharger 24a, a GPS unit 24b, a PDA 24c, a torch 24d and a weapon sub-system 24e) may be retro-fitted to be used with the personal portable power distribution apparatus 10. The ability to use the adapter module 22 to retrofit electronic accessory devices 24 enables the use of existing electronic accessory devices 24, and obviates the need to purchase replacement specially developed accessory devices. The applicant has identified that the power distribution apparatus 10 may be of particular use in an armed force where a very significant cost saving would be achieved by avoiding the need to replace the existing accessory devices currently in use by soldiers in the field.

The central power source 12 may include two rechargeable batteries 12a, 12b or any other portable power source, such as a primary batteries, fuel cells and hybrids of the aforementioned, to power the apparatus 10 under normal operation. An auxiliary power converter 28 may be provided for powering the distribution apparatus 10 from an external power source 30. As shown in FIG. 1, the auxiliary power converter 28 may be connected to one of the power supply nodes 18. The external power source 30 may be in the form of a vehicle power supply, a generator, or some other form of power source, such that, when available, the external power source 30 may be used to conserve the central power source 12.

A control unit 32 is connected to one of the power supply nodes 18 for controlling the distribution apparatus 10. The control unit 32 may also be provided with a display 34 for monitoring battery life of the central power source 12.

Figure 2:
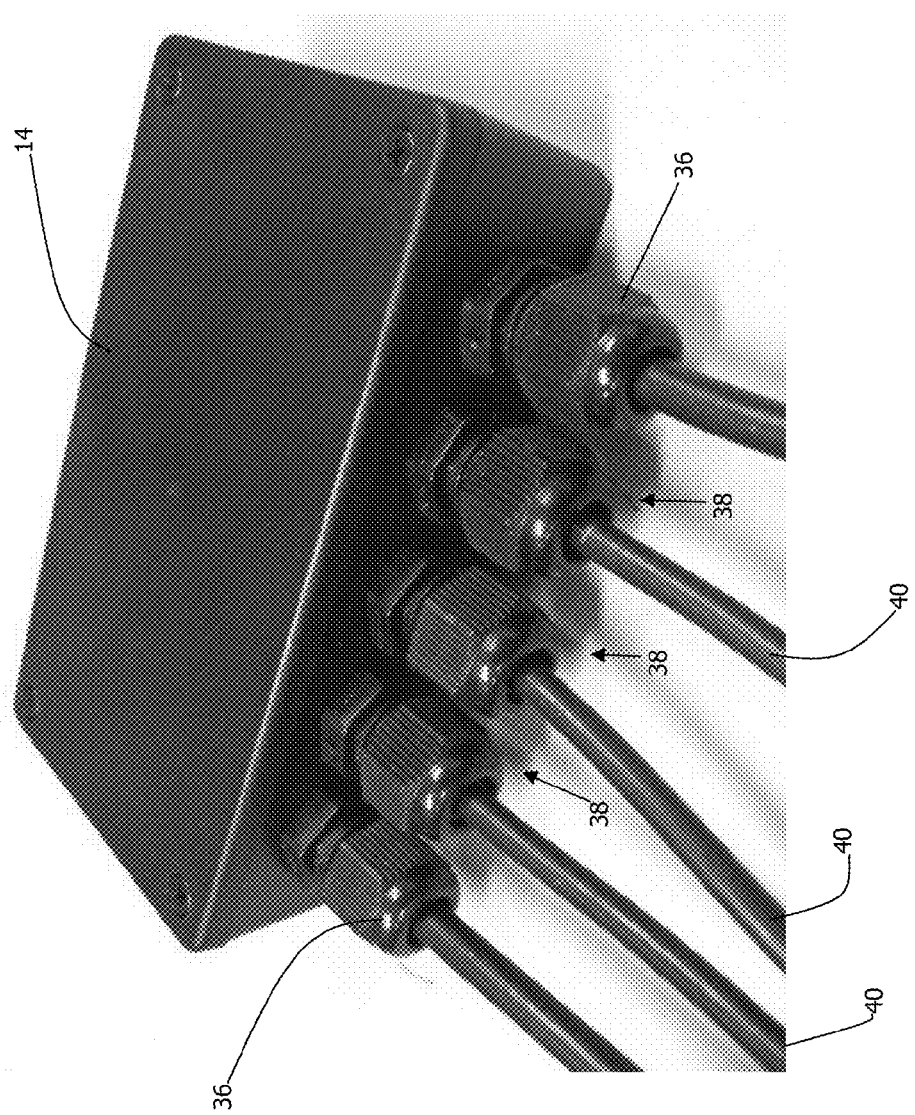
FIG. 2 is a perspective view of a power management module of the personal portable power distribution apparatus shown in FIG. 1.

With reference to FIG. 2, the power management module 14 includes two power source ports 36 for connection to the rechargeable batteries 12a, 12b, and three power network ports 38 for connection to three power leads 40 of the harness assembly 16, which leads terminate in the power supply nodes 18. The harness assembly 16 is adapted to transmit information between components of the power distribution apparatus 10. More specifically, the harness assembly 16 is adapted to transmit information between the electronic accessory devices 24 coupled to the connectors 20 and the power management module 14. The power management module 14 is adapted to identify the electronic accessory devices 24 from the information transmitted and to control characteristics of supply of power to the devices 24 accordingly. By virtue of the ability of the power management module 14 to control supply of power in this way, it can be ensured that the correct power supply characteristics are provided to each of the devices 24, thus enabling the devices 24 to be connected to any of the power supply nodes 18, with suitable adaptation being effected automatically by the power management module 14.

Figure 3:
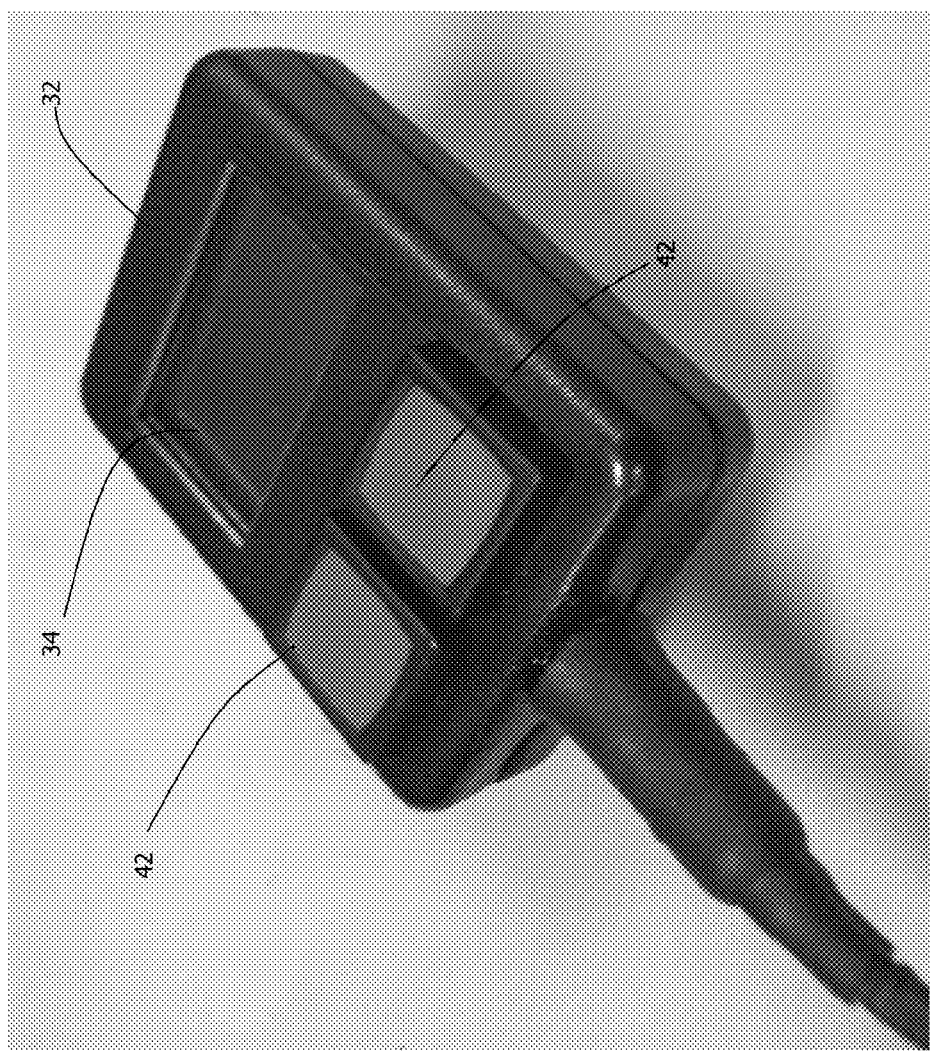
FIG. 3 is a perspective view of a control unit of the distribution apparatus.

FIG. 3 shows a perspective view of the control unit 32 which is adapted for connection to the power management module 14 for controlling power distribution. The display 34 may be used for indicating power remaining in the central power source 12, and buttons 42 may be provided to enable the user to control the electronic accessory devices 24 by operation of the control unit 32. The buttons 42 may also provide functionality to enable the user to control the central power source 12, such as to change settings as to where power is sourced (ie. the split of power supply between the two rechargeable batteries 12a, 12b), and to reduce the rate of power consumption to prolong battery life.

Figure 4A:
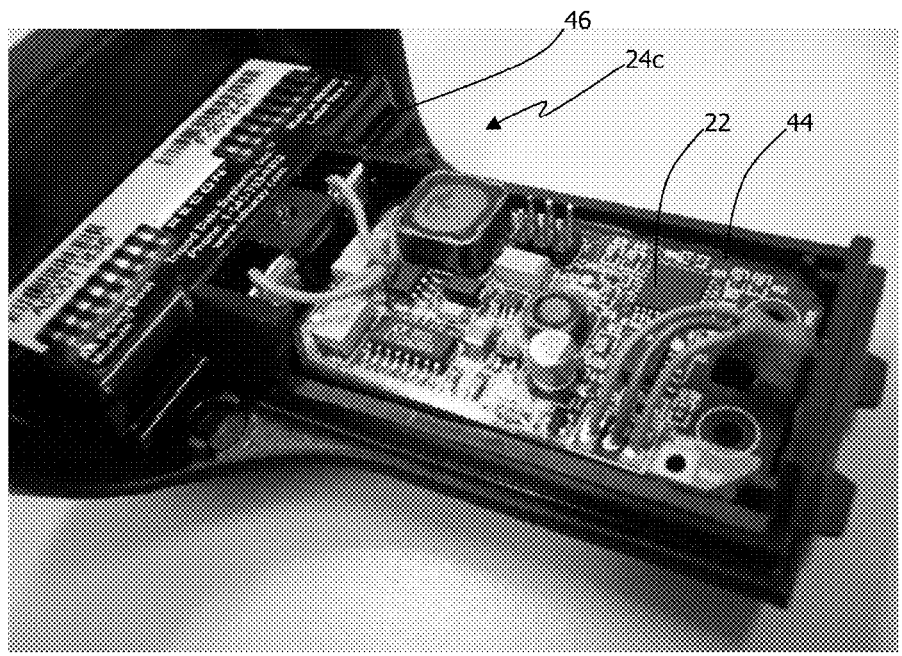
FIG. 4A is a perspective view of a PDA shown fitted with an adapter module, shown in an opened condition.
Figure 4B:
FIG. 4B is a perspective view of the PDA of FIG. 4A, shown in a closed condition.

With reference to FIGS. 4A to 7B, there are shown various depictions of the electronic accessory devices 24 fitted with adapter modules 22, so as to adapt the accessory devices 24 for use with the power distribution apparatus 10. More specifically, FIG. 4A shows an adapter module 22 fitted to the PDA 24c, which serves to retrofit the PDA 24c such that it can operate with the power distribution apparatus 10. As shown in FIG. 4B, the adapter module 22 provides the PDA 24c with a corresponding connector 26 which is suitable for interconnection with the like connectors 20 of the power supply nodes 18. By virtue of circuitry present in the adapter module 22, the power management module 14 is able to identify presence of the PDA 24c when connected to one of the power supply nodes 18, such that characteristics of supply of power to the PDA 24c may be controlled accordingly. The adapter module 22 may have an integrated rechargeable back-up battery for powering the PDA 24c in the event that power is not supplied from the power supply node 18. The adapter module 22 may be specifically made for each different type of electronic accessory device 24, so as to fit within a battery compartment 44 of the device 24, and to be in electrical connection with a power input terminal 46 within the battery compartment 44.

Figure 5A:
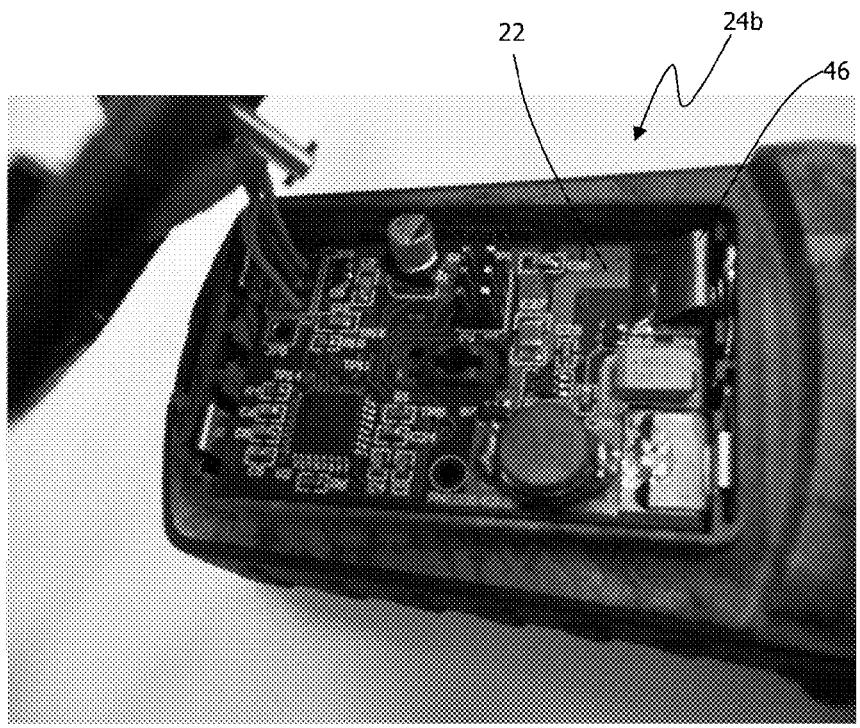
FIG. 5A is a rear view of a GPS unit shown fitted with an adapter module, with a rear cover removed.
Figure 5B:
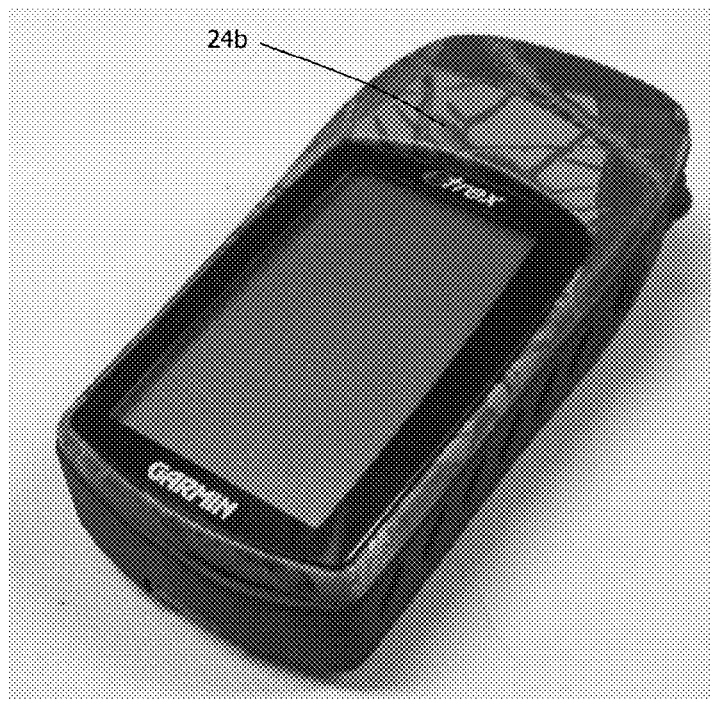
FIG. 5B is a front perspective view of the GPS unit of FIG. 5A.

FIGS. 5A and 5B show fitment of a suitable adapter module 22 within the battery compartment 44 of the GPS unit 24b, arranged so as to supply power to the GPS unit through its power input terminal 46. The back-up battery is typically smaller than the batteries originally intended for the battery compartment 44 such that the adapter module 22 fits wholly within the battery compartment 44 to facilitate normal use of the device.

Figure 6A:
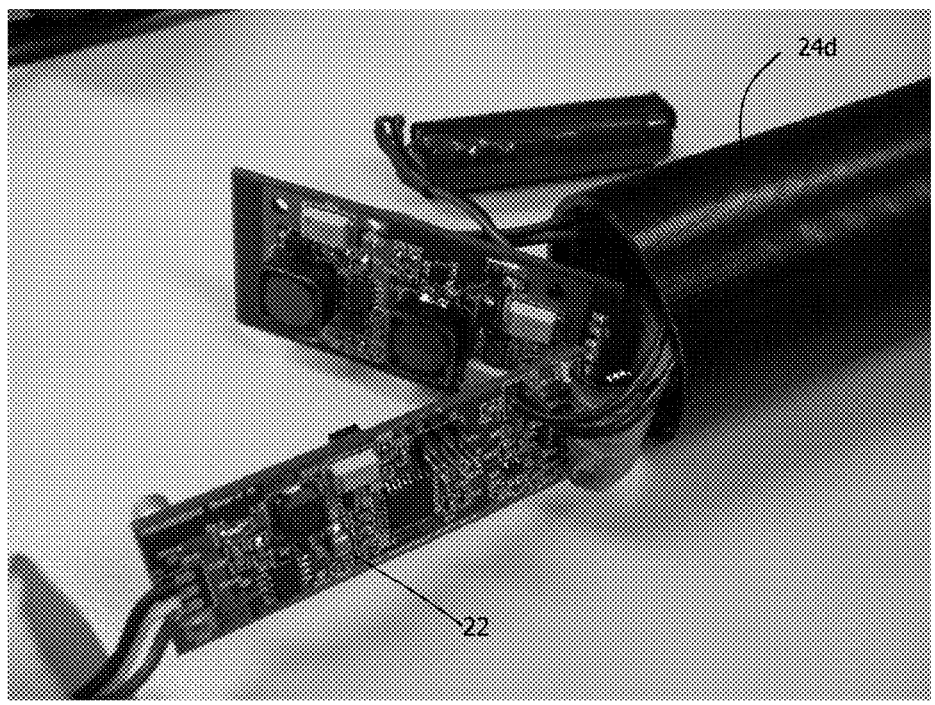
FIG. 6A is a perspective view of an end of a torch, showing an adapter module for fitment to the torch.
Figure 6B:
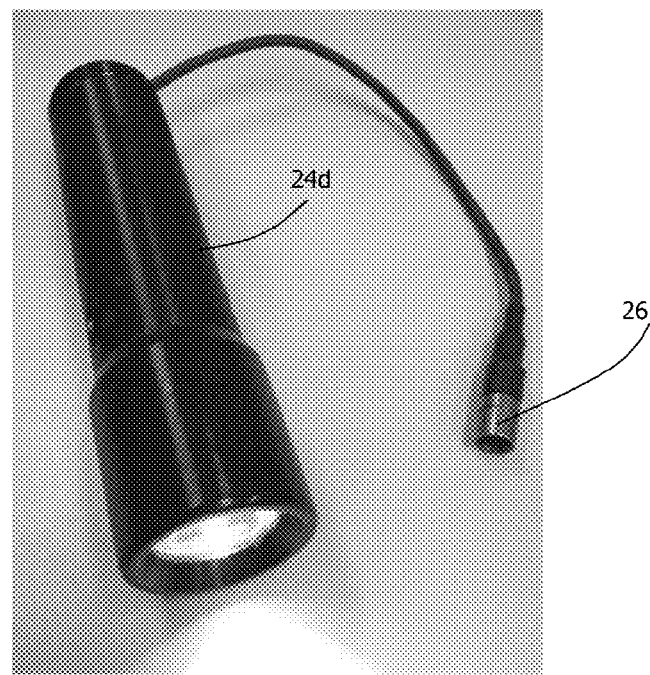
FIG. 6B is a perspective view of the torch of FIG. 6A, shown with the adapter module fitted.

FIGS. 6A and 6B show fitment of a respective adapter module 22 within a battery compartment 44 of the torch 24d, whereby the torch 24d is provided with a corresponding connector 26 which is suitable for interconnection with any one of the like connectors 20 of the power distribution apparatus 10. Even when disconnected from the power distribution apparatus 10, the torch 24d may be operated by virtue of the back-up battery of the adapter module 22, as shown in FIG. 6B.

Figure 7A:
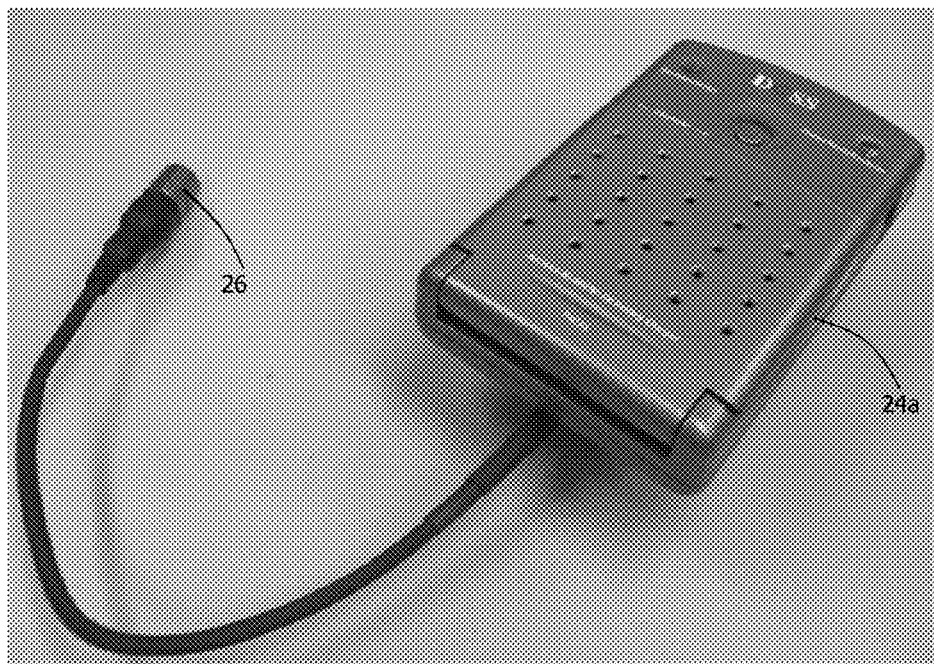
FIG. 7A is a perspective view of a battery charger shown fitted with an adapter module.
Figure 7B:
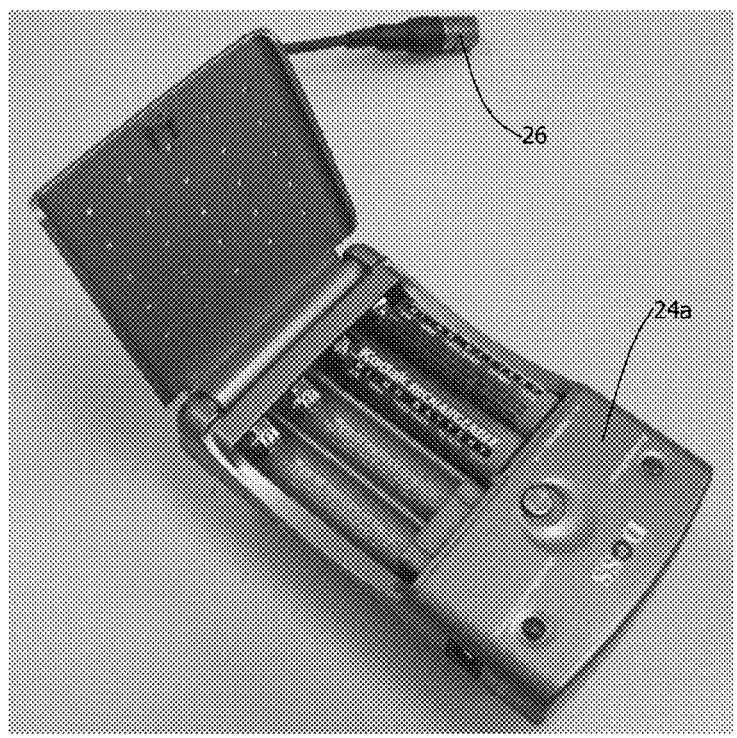
FIG. 7B is a perspective view of the battery charger of FIG. 7A, shown in an open condition.

FIGS. 7A and 7B show the battery recharger when fitted with a suitable adapter module 22. By virtue of the adapter module 22, the battery recharger 24a is able to be connected to any one of the power supply nodes 18 of the power distribution apparatus 10 for recharging batteries for use in other devices. In the specific example shown, the battery recharger 24a is suitable for charging AA size batteries, and these may be used in another device which is not connected to the power distribution apparatus 10.

Figure 8:
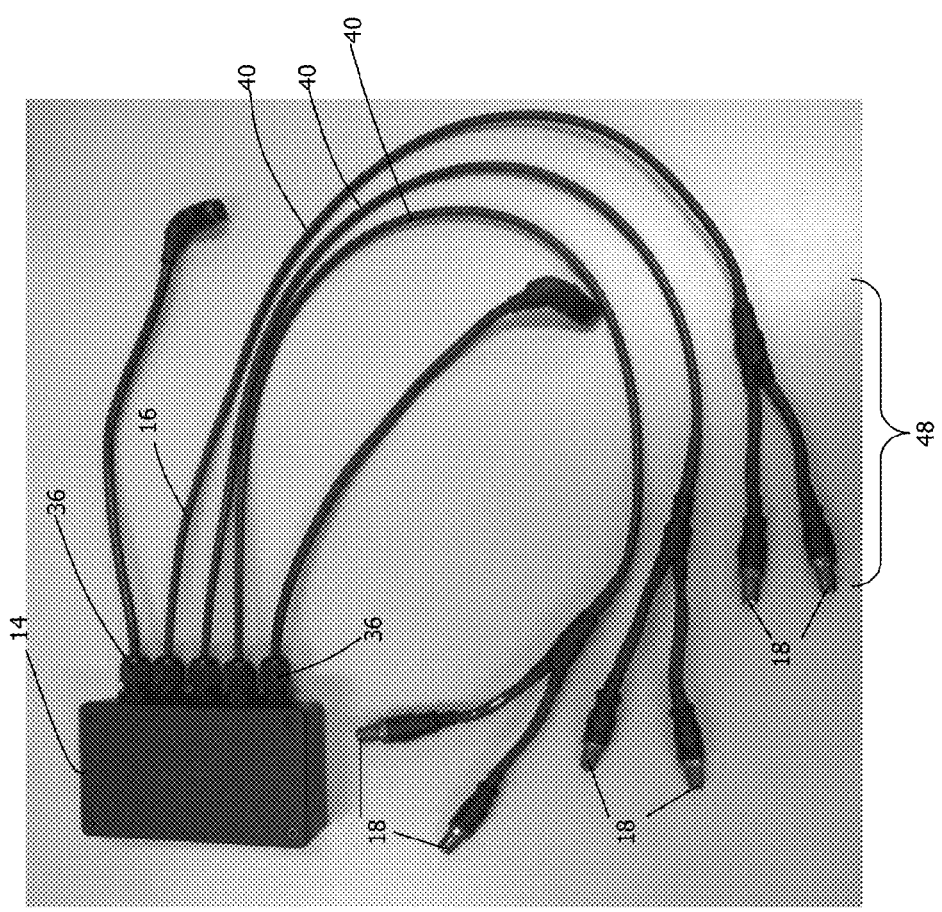
FIG. 8 is a perspective view of the power management module and a harness assembly coupled thereto.
Figure 9B:
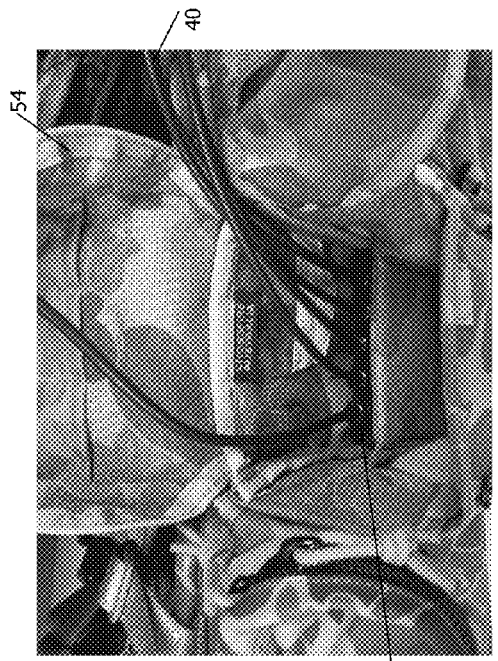
FIG. 9B shows detail of one pouch containing the power management module.
Figure 9C:
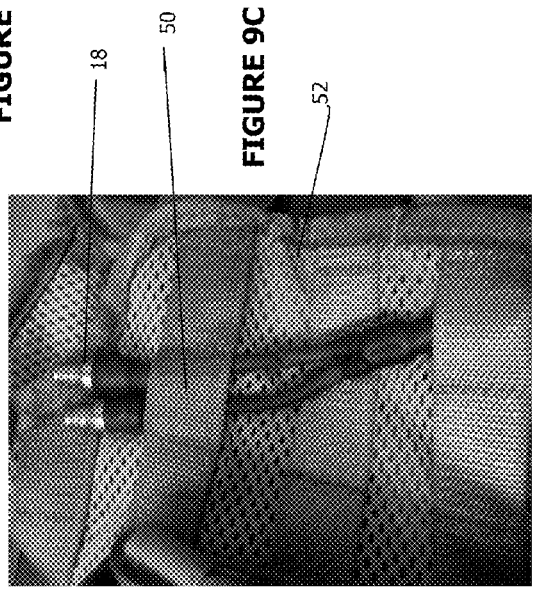
FIG. 9C shows detail of the harness assembly routed through an aperture of the webbing garment.
Figure 9A:
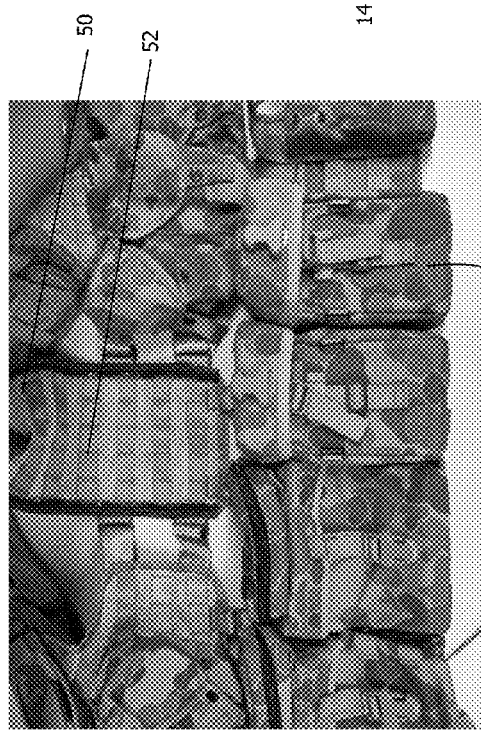
FIG. 9A shows a webbing garment fitted with various pouches.
Figure 10A:
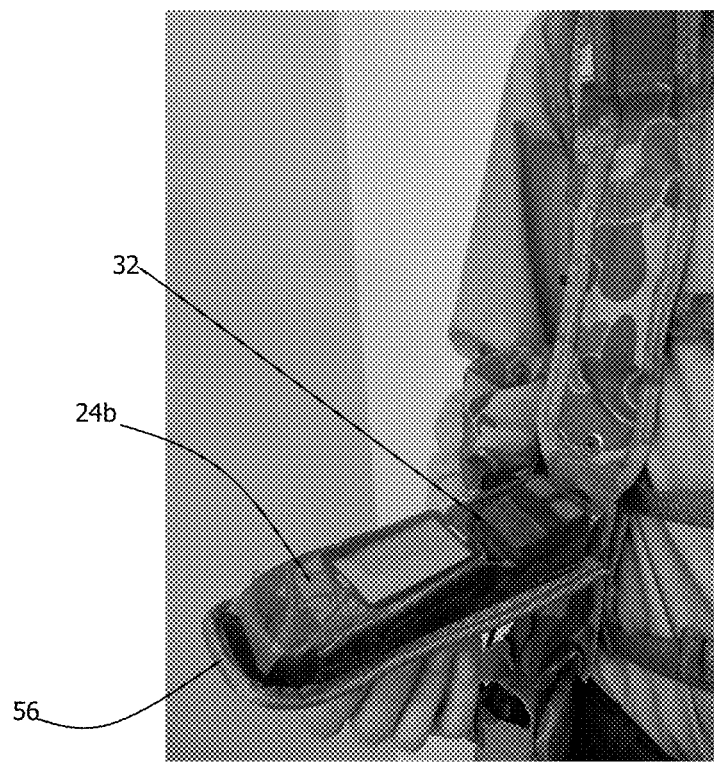
FIG. 10A shows the GPS unit and control unit fitted to the webbing garment, in a deployed condition.
Figure 10B:
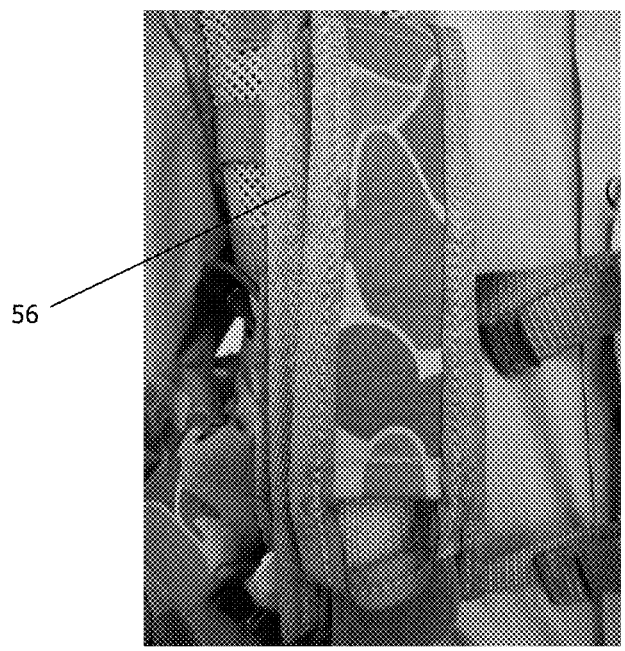
FIG. 10B shows a flap to which the GPS unit and control unit are fitted, in a stowed condition.

An example configuration of the power management module 14 when connected to the harness assembly 16 is shown in FIG. 8. Each of the power leads 40 terminates in two power supply nodes 18, such that there are six power nodes 18 in total. Removable splitter leads similar to end portions 48 of the power leads 40 may be used for increasing the number of power supply nodes 18 available. The power leads 40 are of sufficient length to reach chest, abdominal and/or shoulder regions of a garment 52 to which the power distribution apparatus 10 is fitted. More particularly, the harness assembly 16 has three power leads 40 for reaching left-hand, right-hand and central parts of the garment 52. Accordingly, these regions of the garment 52 are reached by routing the harness assembly 16, and additional devices 24 at these regions may be powered by fitment of the splitter leads to the power leads 40.

With regard to FIGS. 9A to 11B, the power distribution apparatus 10 is fitted to the garment 52 for wearing by the user. The garment 52 may be a webbing type garment, such as of the kind typically used by soldiers in the field. The power distribution apparatus 10 may be fitted to the garment 52 by routing the power leads 40 of the harness assembly 16 through apertures 50 formed in the garment 52, and by locating the or each electronic accessory device 24 in a respective pouch 54 or other location for being carried by the webbing garment 52. With reference to FIGS. 9C and 11A in particular, where each power lead 40 terminates in at least two power supply nodes 18, each power lead 40 may be held in place relative to a respective aperture 50 by the at least two power supply nodes 18. Specifically, the pair of power supply nodes 18 on each power lead 40 are sized relative to the aperture 50 such that they require being fed one at a time through the aperture 50 in order to withdraw the power lead 40 from the aperture 50. This assists in preventing inadvertent shifting of the power distribution apparatus relative to the webbing garment 52. As shown in FIG. 9B, the power management module 14 may be housed within a pouch 54, and the harness assembly 16 may be routed through the apertures 50 in the garment 52 with the power leads 40 being at least partly concealed behind modular pouches of the webbing type garment 52 (see FIG. 11A).

Figure 11A:
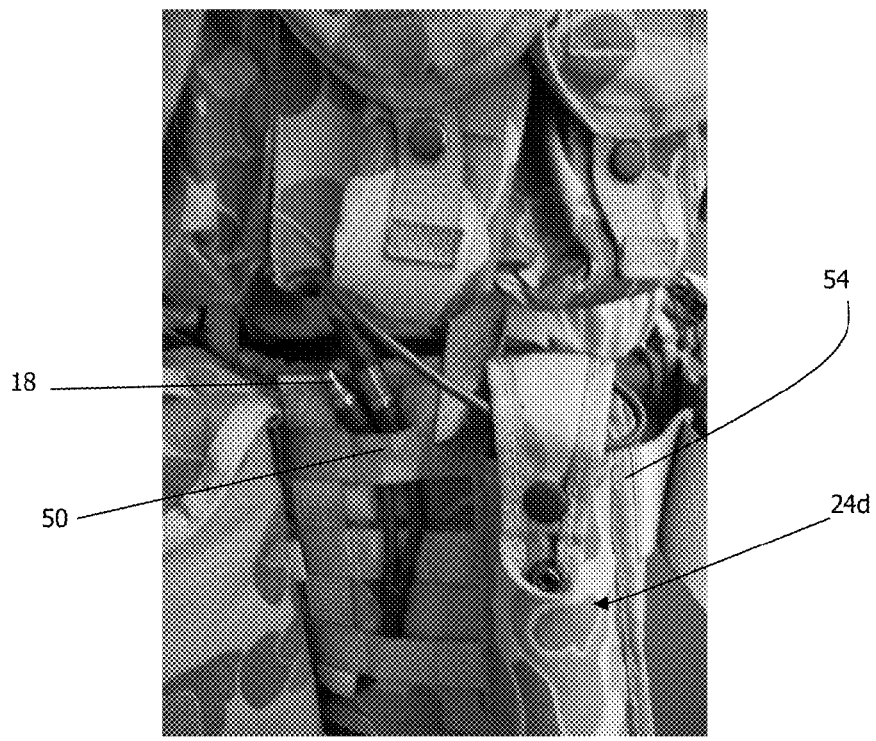
FIG. 11A shows detail of routing of the harness assembly through an aperture of the webbing garment.
Figure 11B:
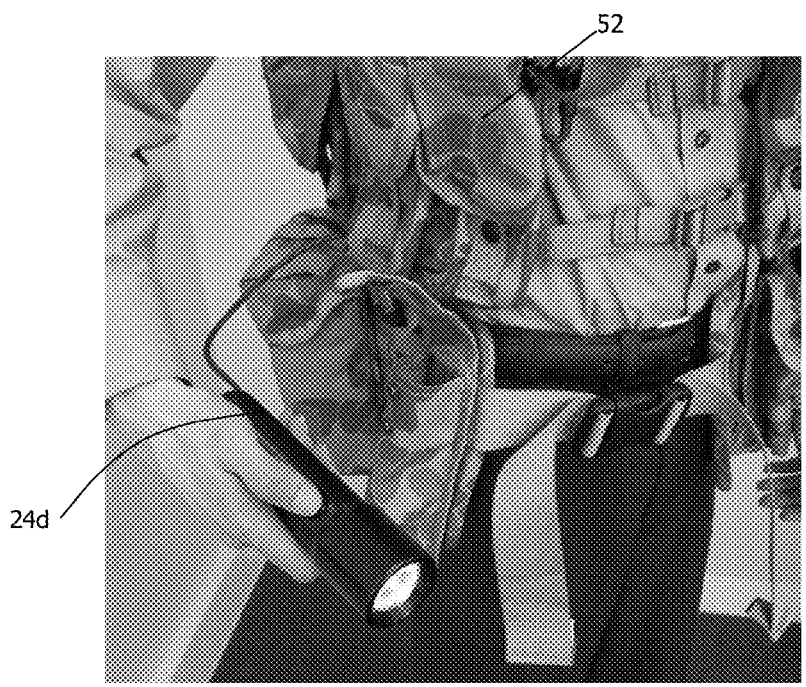
FIG. 11B shows the torch fitted to the webbing garment, in a deployed condition.

The GPS 24b may be mounted together with the control unit 32 on a flap 56 which is movable between a deployed condition (see FIG. 10A) for convenient use, and a stowed condition (see FIG. 10B) wherein the GPS 24b and control unit 32 are stored safely near the chest of the user. FIGS. 11A and 11B show routing of the power distribution apparatus 10 through the webbing garment 52. In particular, FIG. 11A shows retention of a pair of power supply nodes 18 at an aperture 50 of the webbing garment 52, and connection of the torch 24d to one of the power supply nodes 18, the torch 24d being stowed within a suitable pouch 54. FIG. 11B shows the torch 24d in use.

FIG. 12 shows a flowchart illustrating operation of the control unit 32. In a first screen 58, the display 34 shows the number of items detected in the system, and shows labels for each of the buttons 42 which operate as soft keys. By pressing the right-hand button, the display 34 changes to a second screen 60 showing a status of one of the electronic accessory devices 24. The status for each of the electronic accessory devices 24 connected to the distribution apparatus 10 may be viewed in order of power consumption by pressing the right-hand button again. The device 24 to which the display 34 currently relates may be toggled on/off by pressing the left-hand button. Statistics are provided to the user as to the percentage of time that the device 24 is used, and the amount of power remaining in the central power source 12. An equipment scenario screen 62 shows the user the amount of time remaining in the central power source 12 if the device 24 is used at the present usage, as well as if the device is not used/used constantly. In this way, the user is provided with information which assists in the management of the central power source 12, to assist in preventing unexpected depletion of the central power source 12.

Example

Specific details of an example portable power distribution apparatus 10 are provided below. In particular, the example describes an Integrated Power Management Network fitted to the user's equipment vest.

A Power Management System provides the core functionality to an Integrated Power Management Network and consists of the following sub-components:
　Power Management Module (PMM)
　Control and Display Unit (CDU)
　Central Power Source (CPS)
　Auxiliary Power Converter (APC)
The apparatus includes the following design features:
　Central Power Source (CPS)
　　Consists of two Lithium-Ion rechargeable batteries to power the system under normal operation
　　The Central Power Source can be recharged in situ through any power node
　Power Management Module (PMM)
　　Distributes power to the Network
　　Interfaces to the Central Power Source
　Network data communications through a LIN Bus interface
　Power Network Harness Assembly
　　Distributes power and communications from the PMM to each connected item on the Power Network
　Command and Display Unit
　　Provides the User Interface to the Power Network System
　Auxiliary Power Converter
　　Provides the user with an optional capability to power the network from an external power source
　　Provides power to recharge the CPS batteries
The Power Management Module (PMM) consists of the following design features:
　3 Power Network Ports
　　For connection to Power Network
　　Isolated LIN Bus on each Port
　2 Power Supply Ports
　　For connection to Central Power Source batteries
　　SMBus communications interface
　Lithium-Ion SMBus compliant battery charger
The Control and Display Unit (CDU) consists of the following design features:
　Graphic LCD display with blue LED backlight
　　Blue backlight for reduced visible signature
　Simplified 2 button user input interface
The Auxiliary Power Converter (APC) consists of the following design features:
　Provides the User with the capability to supply power to the system from an external power source
　　Output voltage is regulated to a nominal 18.5V
　　Accepts any DC voltage from 9 to 36V
　　Suitable for 12V and 24V vehicle power systems
　When connected to the Power Network, provides power to recharge the Central Power source batteries
　　The PMM battery charger will detect if the APC is on the network and is capable of supplying the required charge voltage
　Intended to be a separate item from the LCE
　　Ideally, the APC forms part of User's in-vehicle equipment inventory
The Central Power Source (CPS) consists of two Ultralife Lithium-Ion rechargeable batteries for:
　Increased power storage capacity (7.2 Ah each)
　Load weight balance when distributed equally on either side of the user
　Power source redundancy
The electrical interface to the User's Equipment is through the Equipment User Interface (EUI)
　Provides power conversion between the Power Network Bus voltage and the Equipment input voltage The User Equipment demonstrated in this example include the following:
　Personal Role Radio
　GPS (Commercial Garmin eTrex model)
　PDA (TDS Recon)
　Torch (Modified commercial unit)
　Weapon sub-system (weapon itself, laser aiming module, video sight, thermal sight, red dot sight)
　AA Battery Charger (Commercial unit)
　　For charging batteries from Equipment that do not have an interface to the Power Network. E.g. Night Vision Goggles (NVG)
The EUI electronics for the above equipment were all installed within each battery compartment and furnished with a leader terminated with a Power Node Receptacle for direct connection to the Power Network.
The Torch demonstrates the typical power management design features of equipment that fully utilize the capabilities of an Integrated Power Management Network, and are given as follows:
　Communications interface to the Power Network
　LED driver to allow for output intensity dimming through PMM control
　Internal Li-Ion battery for standalone operation
　Built in Li-Ion battery charger
　No double power conversion efficiency losses
　Advanced power control features
　The Torch electronics fits within the existing battery compartment barrel
　Connection from the EUI to the Power Network is through a harness leader terminated with a Power Node Receptacle
The Power Network Harness Assembly consists of:
　Power Network Harness
　　Provides the interconnect between the PMM and the Power Network Nodes
　　3 sets, branched at the end to form a pair of network nodes
　Power Port Harness
　　Provides the interconnect between the PMM and the CPS batteries,
All harness assemblies connect to the PMM directly through glands
　Reduces weight by minimising connectors
　Increased reliability
The battery pack pouches utilise a partition to secure a battery and either the PMM or charger unit.
　The Power Network Assembly is installed onto the User's Load Carriage Equipment Vest (LCE) in the following order:
　　The PMM/Battery Pouch is fitted to the LCE
　　The Supplementary Battery Pouch is fitted to LCE
　　Install PMM assembly into Battery Pack pouch compartment
　　Install charger in second Battery Pack pouch compartment
　　Route Power Network Harness Assemblies to suit the layout of the User Equipment to the LCE
　　　Power Nodes/Harness are routed through the LCE webbing
　　　Each Power Node plug is routed one at a time
　　Install Battery 1 into the PMM/Battery Pouch
　　Install Battery 2 into the Supplementary Battery Pouch
　　Connect battery harness to batteries, routing the battery 2 harness from the PMM pouch
The assembly procedure for each User Equipment involves:
　installing the Equipment into the appropriate pouch Fitting the Equipment/Pouch Assembly to the LCE
Routing the harness leader such that connection to a Power Node is made The main functions of the Power Management System include:
  Ensure all system components can communicate effectively with each other
  Select the CPS battery currently used to power the system
  Select the CPS battery to be recharged if the APC is connected
  Provide the User with system power state information
  Provide the User with Equipment power usage information
  Allow the User to control the power state of Equipment The CDU can operate in one of three general states:
  Idle
    The display and backlight is off
  Active
    Normal operation—menu driven display interface
  Blackout
    The display and backlight is off
    Entered by pressing any switch more than 5 s Upon entering the Active state, the CDU will display one of four Home screens.
Selecting the NEXT menu option from a Home screen navigates to further menu screens.
Continuous presses of the NEXT menu option navigates through each screen until the system returns to the Home screen.
The Power Management System automatically detects the presence of the batteries.
All information related to the CPS batteries is found in the battery information screens
  Each battery will be allocated a battery information screen
    E.g. Battery 1
  The battery information screen tells the User if the currently display battery is Active or in Standby
  The current battery charge capacity is displayed
  If the PMM detects a low State of Health, a warning to the User will be flagged
All information related to the User's equipment is found in the Equipment List screens.
The CDU automatically orders all items found in the Equipment List with the highest power consumer first
  The User can quickly determine which items are making a significant contribution to power consumption
Each item in the Equipment List has two associated information display screens
  Equipment Usage Screen
    Current Equipment Usage and power consumption as a percentage of total system power
    Current power state and ON/OFF selection
  Equipment Scenario Screen
    Displayed periodically every 2 s
    Displays the predicted system Operating Time Remaining (OTR) if the Equipment item usage is reduced to 0% or 100%
    Allows User to quickly assess if changing the usage of the selected Equipment will have a significant effect on the OTR
The Torch EUI has an additional feature where the output intensity can be controlled
The power ON/OFF menu item is expanded to include a cyclical selection between the following states:
  OFF (also switches charging off)
  25%
  50%
  75%
  100%

When the User requests a Black-Out, the PMM commands all EUIs to switch power to Equipment off
  Allows the User to quickly power down all equipment to reduce power consumption or minimise equipment operating signature Advantageously, power management architectures in accordance with examples of the invention, when applied to the equipment carried by a soldier or other complex power consuming systems, can provide significant benefits in terms of mass, operational effectiveness and cost.

It will be understood that examples of the invention may include equipment specific modules that are either specially manufactured for legacy devices or included as part of the equipment by the OEM. Advantageously, the power distribution harness transmits power from the centralised power source, via the power distribution module to the equipment specific modules, and also transmits data relating to power usage allowing centralised control of each piece of equipment.

Use of a personal portable power distribution apparatus in accordance with examples of the present invention may provide a number of significant benefits, as follow:

(i). Mass of batteries carried may be reduced by allowing batteries and other power sources (such as fuel cells) of high energy density to be used for the centralised power source. The original batteries are removed from the pieces of equipment and replaced by the equipment specific module.

(ii). Reduction of battery changes needed, and consequently the amount of time spent during an operation in which the operator is looking at equipment rather than maintaining situation awareness.

(iii). Reduction of the amount of time during a mission that equipment is inoperable through being engaged in the process of having batteries changed.

(iv). Reduction of the number of times equipment must be removed from its mounting.

(v). Reduction of the number of times battery compartment doors of individual items of equipment are opened. Equipment is exposed to the elements and be put at risk of seal damage and breakage during these operations.

(vi). Reduction in the number of different types of batteries to be carried, disposed of and consequently the logistic burden. More batteries and power sources of fewer designs leads to economies of scale in procurement.

(vii). Reduction of the cognitive load on the operator by reducing the number of independently powered systems that must be monitored to ensure all have adequate operating time remaining before a battery change is necessary.

(viii). Reduction of the cost of battery supply by improving the utilisation of primary batteries. Many batteries are discarded after having only been partially discharged. A central power management network can provide for any battery to be fully discharged before it is discarded. This can contribute to significant savings in both the mass of batteries and the associated cost of the batteries carried at the start of a mission.

(ix). By reducing the time between battery changes, potentially to the extent that no changes are needed during the mission, the risk of equipment malfunction during the mission is reduced.

(x). Power is distributed to the individual items of equipment at the highest possible voltage so as to reduce currents carried by the conductors and hence reducing the $I^2R$ losses.

(xi). Enabling the use of secondary or rechargeable batteries by providing reliable state of health and state of charge notification to the operator for each battery prior to the start of a mission. This will give the operator confidence that the power being carried into the mission is adequate to meet the mission power needs.

(xii). Accepting power from emerging power technologies such as Fuel Cells, flexible solar arrays, energy harvesting equipment, vehicle power systems, and field generators.

(xiii). Facilitating sharing of power between operators and equipment. Any node on any network can be connected to any other node to allow the transfer of power between networks (xiv). Maximisation of the ability to extract power from primary batteries as they are discharged and their supply voltage and surge current drops below equipment demands through the use of hybrid primary and secondary battery systems. In this structure, a primary battery recharges a secondary battery so that when the peak power demand of the system is greater than the peak power that can be supplied by the primary battery, the system continues to operate correctly on the surge power supplied by the secondary battery. This arrangement works for as long as the average power demand of the system is lower than the average ability of the primary battery to deliver power and until the secondary battery has been discharged. Where the system uses a lower average power in short peaks, there is the potential to use a DC to DC converter to boost the primary battery voltage. This arrangement can recharge the secondary battery even when the voltage level of the primary battery drops below that needed to operate the equipment. The equipment then operates from the secondary battery until the primary battery power has been effectively exhausted. This residual power is discarded with the primary batteries at present.

(xv). Providing the operator with the ability to monitor power consumption and evaluate different power usage strategies to maximise mission success. This is made available through a simple operator interface that shows operating time remaining, the power being used by each device on the network and the effect of changing the utilisation of any device.

(xvi). Implementation of automatic power saving strategies (at the operator's option) so that devices with high standby power are shut down when they are not being used. For example, where an operator is carrying two radios with high standby power consumption, it may be possible to shut down one radio when the other is transmitting or receiving if the operator knows that both radios will never be used at the same time. The power management network can automatically shut down the idle radio when it detects the power consumption associated with the other radio receiving or transmitting.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A personal portable power distribution apparatus comprising:
    a central power source configured to supply power to the portable power distribution apparatus while being portable independently of a mains power supply;
    a power management module coupled to receive power from the central power source;
    and a harness assembly having a plurality of power supply nodes for distributing power from the power management module, the plurality of power supply nodes being arranged to connect a plurality of electronic accessory devices in simultaneous powered connection to the central power source, wherein the power management module is operable to control supply of power through each individual power supply node, each power supply node terminating in a like connector;
    wherein at least one of the electronic accessory devices is in the form of an existing electronic accessory device and an adaptor module is fitted to a power input interface of the existing electronic accessory device to adapt the existing electronic accessory device for operation with the power distribution apparatus by providing a corresponding connector suitable for interconnection with said like connectors;
    wherein the personal portable power distribution apparatus, including the central power source, is configured to be worn by a human user to be carried by the body of the human user, whereby the personal portable power distribution apparatus is arranged to power the electronic accessory devices while the apparatus is being worn and while the electronic accessory devices are being operated by the user; and
    wherein each power supply node communicates data from the respective electronic accessory device connected thereto to the power management module to specify the type of user equipment identity of the electronic accessory device to the power management module irrespective of which of the like connectors the device is connected to, and wherein the power management module manages power usage of the electronic accessory device accordingly and wherein data is communicated bidirectionally from the power management module to at least one of the electronic accessory devices, and wherein the data is power related and/or non-power related.

2. A personal portable power distribution apparatus as claimed in claim 1, wherein a plurality of electronic accessory devices are retro-fitted for operation with the power distribution apparatus by fitting an adaptor module to each of the devices, to provide each device with a corresponding connector suitable for interconnection with the like connectors.

3. A personal portable power distribution apparatus as claimed in claim 2, wherein the power management module is adapted to identify the electronic accessory devices and to control characteristics of supply of power to the devices accordingly such that the locations of the different devices may be interchanged between different connectors.

4. A personal portable power distribution apparatus as claimed in claim 2, wherein each adaptor module may have the additional feature of a back-up battery for powering the respective device in the event that power is not supplied from the central power source.

5. A personal portable power distribution apparatus as claimed in claim 1, wherein the apparatus is fitted to a garment for wearing by the user.

6. A personal portable power distribution apparatus as claimed in claim 5, wherein the garment is a webbing type garment, and wherein the apparatus is fitted to the garment by routing power leads of the harness assembly through apertures formed in the garment, and by locating the or each electronic accessory device in a pouch or other location for being supported by the webbing.

7. A personal portable power distribution apparatus as claimed in claim 6, wherein each power lead terminates in at least one power supply node.

8. A personal portable power distribution apparatus as claimed in claim 7, wherein each power lead is held in place relative to a respective aperture in the garment by at least two power supply nodes which are sized relative to the aperture such that they require being fed one at a time through the aperture in order to withdraw the power lead from the aperture.

9. A personal portable power distribution apparatus as claimed in claim 7, wherein the power distribution apparatus further includes removable splitter leads for increasing the number of power supply nodes available.

10. A personal portable power distribution apparatus as claimed in claim 7, wherein each power lead terminates in two or more power supply nodes.

11. A personal portable power distribution apparatus as claimed in claim 6, wherein the power leads are routed through said apertures of the garment with the power leads being at least partly concealed behind modular pouches of the webbing type garment.

12. A personal portable power distribution apparatus as claimed in claim 5, wherein the harness assembly comprises a plurality of power leads of sufficient length to reach chest, abdominal and/or shoulder regions of the garment.

13. A personal portable power distribution apparatus as claimed in claim 12, wherein the harness assembly comprises a number of power leads for reaching left-hand, right-hand and central parts of the garment.

14. A personal portable power distribution apparatus as claimed in claim 1, wherein the harness assembly is adapted to transmit information between components of the power distribution apparatus.

15. A personal portable power distribution apparatus as claimed in claim 14, wherein the harness assembly is adapted to transmit information between the electronic accessory devices coupled to the connectors and the power management module, and wherein the power management module is adapted to identify the electronic accessory devices from said information transmitted, to monitor power consumption, and to control characteristics of supply of power to the devices accordingly.

16. A personal portable power distribution apparatus as claimed in claim 1, further including a control unit connected to the power management module for controlling power distribution.

17. A personal portable power distribution apparatus as claimed in claim 16, wherein the control unit has a display indicating power remaining in the central power source.

18. A personal portable power distribution apparatus as claimed in claim 16, wherein the control unit is adapted to enable the user to control the electronic accessory devices by operating the control unit.

19. A personal portable power distribution apparatus as claimed in claim 16, wherein the control unit is adapted to enable the user to control the central power source by operating the control unit.

20. A personal portable power distribution apparatus as claimed in claim 1, wherein the power management module is operable to distribute power to the individual electronic accessory devices at the highest possible voltage so as to reduce current and thus energy loss through resistance.

21. A personal portable power distribution apparatus as claimed in claim 1, wherein the central power source is configured to store power and includes a battery or fuel cell or other power storage device.

22. A personal portable power distribution apparatus comprising:
a central power source configured to supply power to the portable power distribution apparatus while being portable independently of a mains power supply;
a power management module coupled to receive power from the central power source;
and a harness assembly having a plurality of power supply nodes for distributing power from the power management module, the plurality of power supply nodes being arranged to connect a plurality of electronic accessory devices in simultaneous powered connection to the central power source, wherein the power management module is operable to control supply of power through each individual power supply node, each power supply node terminating in a like connector;
wherein the personal portable power distribution apparatus, including the central power source, is configured to be worn by a human user to be carried by the body of the human user, whereby the personal portable power distribution apparatus is arranged to power the electronic accessory devices while the apparatus is being worn and while the electronic accessory devices are being operated by the user; and
wherein each power supply node communicates data from the respective electronic accessory device connected thereto to the power management module to specify the type of user equipment identity of the electronic accessory device to the power management module irrespective of which of the like connectors the device is connected to, and wherein the power management module controls characteristics of power usage of the device accordingly and wherein data is communicated bidirectionally from the power management module to at least one of the electronic accessory devices, and wherein the data is power related and/or non-power related.

23. A personal portable power distribution apparatus as claimed in claim 22, wherein the central power source is configured to store power and includes a battery or fuel cell or other power storage device.

24. A personal portable power distribution apparatus as claimed in claim 22, wherein the like nodes are configured to accept power from a power supply device connected via a suitable adaptor to recharge the central battery.

25. A personal portable power distribution apparatus as claimed in claim 24, wherein the power management module advises the user of the amount of power being supplied by the power supply device.

26. A personal portable power distribution apparatus as claimed in claim 22, wherein the like nodes are configured to accept power from a power supply device connected via a suitable adaptor to power the connected devices.

27. A personal portable power distribution apparatus as claimed in claim 26, wherein the power management module advises the user of the amount of power being supplied by the power supply device.

28. A personal portable power distribution apparatus as claimed in claim 22, wherein the power management module is configured to read the state of health and state of charge of the central power supply, the central power supply being equipped with the ability to communicate with the power management module; and wherein the power management module is configured to alert the user if the central power supply requires any remedial action or attention from the user.

29. A personal portable power distribution apparatus as claimed in claim 22, wherein the central power supply includes multiple sources of power and the apparatus is adapted such that the user can select which of the multiple sources of power is to be used to either provide power to the connected devices or, where an excess of power is available, which of the connected multiple sources of power is to receive power, as appropriate.

* * * * *